United States Patent Office
2,917,471
Patented Dec. 15, 1959

2,917,471
PEPTIZATION PROCESS FOR POLYURETHANES

Jerry A. Nelson, Newark, Del., assignor to E. I. du Pont de Nemours and Company, Wilmington, Del., a corporation of Delaware No Drawing. Application April 5, 1954
Serial No. 421,190

8 Claims. (Cl. 260—2.3)

This invention relates to a method of peptizing polyurethane products containing in their molecules a plurality of polyoxyalkylene units of high formula weight.

Elastomeric polyurethane products of the type with which this invention is concerned are disclosed and claimed in pending application Serial No. 365,270 of Hill, filed June 30, 1953. These products are ordinarily formed by reacting together a polyalkylene ether glycol, such as polytetramethylene ether glycol, having a molecular weight of at least 750, with an organic diisocyanate such as 2,4-tolylene diisocyanate and a chain-extending agent such as water. The diisocyanate is present in molar excess with respect to the glycol. In the formation of these products, urethane groups, —NHCOO—, are formed by the reaction between the hydroxyl groups of the polyalkylene ether glycol and the isocyanate groups, while urea groups, —NH—CO—NH—, are also formed by reaction of the isocyanates with the chain-extending agent in case the latter is water or a diamine. The resulting polymeric product accordingly contains a plurality of urethane groups and of polyoxykyene units which are the residues of the polyalkylene ether glycol, and usually also contains a plurality of urea groups. These polymers are highly valuable products which can be cured to give elastomers having outstanding resistance to abrasion and ability to withstand low temperatures without becoming brittle.

When the polymeric reaction product still contains free isocyanate groups, it may be stabilized against premature curing by the addition of a primary or secondary nitrogen base such as piperidine, as disclosed and claimed in pending application Serial No. 379,291 of Nelson et al., filed September 9, 1953. When it is desired to cure stabilized products of this sort or unstabilized products containing only a small number of free isocyanate groups, it is necessary to add further amounts of a diisocyanate or other curing agent. Products of this sort to which curing agents have been added and unstabilized polymers containing a substantial number of free isocyanate groups can be formed into the desired shape and cured, ordinarily by the application of heat and pressure, to give useful elastomers.

If the initial reaction between the polyalkylene ether glycol, diisocyanate and chain-extending agent is permitted to proceed too far, the product tends to become too viscous for easy handling and some precuring or scorching is apt to take place. In this case the product cannot be molded properly and gives final products which are not homogeneous. The conventional peptizing agents used with natural rubber or other synthetic rubbers are generally ineffective in reducing the viscosity of polyurethane elastomers of this type. Such peptizing agents are also ineffective in breaking down or reclaiming cured polyurethane elastomers so that they may be reused.

It is an object of this invention to provide a process by which viscous polyurethane products containing high formula weight polyoxyalkylene units may be peptized to a more workable state. A further object is to provide a process for reclaiming cured or vulcanized polyurethane elastomers. Further objects will appear from the detailed description of this invention which follows.

According to the present invention, high molecular weight polyurethane products containing a plurality of polyoxyalkylene units of formula weight of at least 750 are peptized by mixing the said polyurethane product with a peptizing amount of a lower alkylolamine having at least one hydrogen atom attached to nitrogen and mechanically working the mixture.

More particularly, these high molecular weight polyurethane products containing a plurality of polyoxyalkylene units may be prepared by the reaction between a polyalkylene ether glycol having a molecular weight of from about 750 to about 10,000, an organic diisocyanate and a chain-extending agent which is a compound containing a plurality of active hydrogen atoms capable of reacting with isocyanates. Representative chain-extending agents include compounds such as water, hydrogen sulfide, and organic compounds containing two functional groups which have active hydrogen atoms attached thereto. Thus, the polyalkylene ether glycol may be reacted with a molar excess of the organic diisocyanate in molar ratios of diisocyanate to glycol of from about 1.1:1 to 12:1 so as to form an isocyanate terminated polymer which may be represented by the formula OCN—B(NH—CO—O—G—O—CO—NH—B)$_n$—NCO wherein O—G—O is a bivalent radical resulting from the removal of the terminal hydrogen atoms from a polyalkylene ether glycol, B is a bivalent organic radical which is inert to isocyanate groups, and $n$ is an integer greater than zero. This isocyanate-terminated polymer may then be reacted with a chain-extending agent containing active hydrogen atoms so as to form the high molecular weight polyurethane product. The reactions of isocyanate with the active hydrogen-containing groups present in the various typical chain-extending agents are described in the literature proceeding as follows:

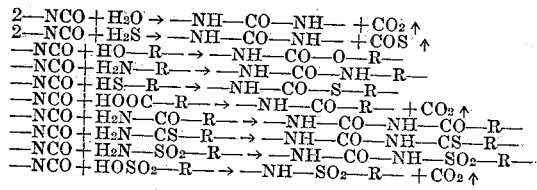

It is apparent from the foregoing table that when water and hydrogen sulfide are used as chain-extenders, there is a carbonyl linking group between the imino groups, which imino groups are attached to the isocyanate residues. When the other typical chain-extenders are used, an acyl radical is attached to the imino group. Thus, when these other typical chain-extenders react with two free isocyanate groups of the isocyanate-terminated polymer units and, if present, molecules of the original diisocyanate, a diacyl radical is the connecting radical between the imino groups which are attached to the isocyanate residues. These diacyl radicals are non-polymeric, are free from any intralinear unsaturation other than carbon to carbon unsaturation and are hereinafter referred to by the letter "Q."

After reaction of the chain-extending agents with the isocyanate-terminated polymer and any excess diisocyanate which may be present, the resulting polymeric product is a polyurethane polymer being comprised essentially of structural units having the formula:

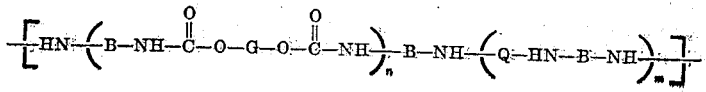

wherein O—G—O, B and $n$ have the significance defined above; Q is a radical selected from the group consisting of a carbonyl radical and a non-polymeric diacyl radical; and $m$ is an integer including zero; each of the said structural units being connected to the next by a radical Q, having the significance defined above. For purposes of the present invention the bivalent radicals O—G—O should comprise at least about 35% of the total weight of the polymer.

These polyurethane polymers may be cured by reacting them with an organic polyisocyanate, preferably at temperatures of about 80° C. to 175° C.

The process of peptization of the above described polyurethane products is conveniently carried out in conventional mixing equipment such as a Werner-Pfleiderer or Banbury type mixer. If in solid form, the polyurethane product is preferably cut into small pieces and together with the necessary amount of alkylolamine is placed in a mixer, which may be heated by means of a steam jacket. Mixing for 5 to 15 minutes is usually sufficient to reduce the pieces of polyurethane product to a homogeneous rubbery mass which can be transferred to a rubber mill and sheeted off into smooth sheets.

The alkylolamines which are useful as peptizing agents in this connection must contain at least one hydrogen atom attached to nitrogen. Useful alkylolamines include those having the formula $X_1$—NH—$X_2$—OH, in which $X_1$ is a member of the class consisting of hydrogen and of alkyl, aminoalkyl and hydroxyalkyl radicals containing from 1 to 4 carbon atoms and $X_2$ is an alkylene radical containing from 2 to 4 carbon atoms. Representative compounds of this class include ethanolamine, diethanolamine, methylethanolamine, ethylethanolamine, n-butylethanolamine, 2-amino-1-butanol, isopropanolamine, diisopropanolamine, n-butanolamine, 2-amino-2-methyl-1-propanol, aminoethylethanolamine and aminoethylisopropanolamine. Also useful are compounds in which $X_2$ is a substituted alkylene radical, as for example 1,3-diamino-2-propanol. Another way to represent these alkylolamines is by the formula $(X)_2$—NH, wherein X is hydrogen and alkyl, aminoalkyl, aminohydroxyalkyl or hydroxyalkyl containing from 1 to 4 carbon atoms, with at least one of the X's being hydroxyalkyl.

The peptizing agents of this invention are useful in reducing the viscosity of any of the polyurethane products described in the aforementioned pending application Serial No. 365,270 of Hill, filed June 30, 1953. These products, as described above, are ordinarily formed by the reaction between a polyalkylene ether glycol, an organic diisocyanate and a chain-extending agent such as water or a diamine, but may also be formed as disclosed in United States Patent No. 2,835,654, by the reaction between a polyalkylene ether bis-chlorformate, an organic diamine and phosgene. Products of this type which it may be desired to peptize are normally somewhat cross-linked, and in the case of cured elastomers, are quite substantially cross-linked. It is probable that mixing with the peptizing agents results in the rupture of at least some of these cross-links, with consequent reduction in the viscosity of the polymeric product. This process is applicable both to polymers which are only slightly more viscous than is desirable and also to cured products which are completely unworkable prior to peptization. The process may thus be employed either as a step in controlling viscosities during manufacture of the polyurethane products, or in reclaiming scrap material or otherwise unusable elastomer. The resulting peptized products may subsequently be cured by adding an appropriate amount of an organic diisocyanate or other curing agent and subjecting to curing conditions. The use of from 1 to 20% by weight, based on the weight of the peptized mixture, of an organic compound containing at least two isocyanate groups, such as 2,4-tolylene diisocyanate, followed by curing at a temperature between 80 and 175° C. is typical of the preferred procedure. Any of the various polyisocyanate curing agents described in the aforementioned application Serial No. 365,270 may be used.

The quantity of alkylolamine to be added depends, in general, on the toughness of the product to be peptized. Polymers which are only slightly too viscous for easy millability can usually be peptized by treatment with from 0.1 to 1 part by weight of the alkylolamine for each 100 parts of polymer. Unless the product has actually been cured, it is seldom necessary to use more than about 1 part of agent per 100 parts of polymer. In the reworking of previously cured elastomer, substantially greater amounts of peptizing agents are required. For this purpose, from 6 to 10 parts by weight of the alkylolamine for each 100 parts of the cured polyurethane product are ordinarily sufficient to produce a millable product.

After the alkylolamine has been added to the polymer, it is necessary that the mixture be subjected to mechanical working. This is preferably done in a mixer which has arms or blades which can macerate the polymer and distribute the alkylolamine uniformly through it. Some effect can be achieved on smooth roll mills where the polymer is not too tough, but tougher products cannot be handled successfully on roller mills. The step of mechanically working appears to be necessary both to secure intimate mixture between the reacting materials and also to supply energy which supplements the effect of the peptizing agent in breaking the cross-links in the polymer.

By use of this process, the intrinsic viscosity of the polyurethane product may ordinarily be reduced to two-thirds or less of its original value. Intrinsic viscosity may be determined by dissolving 0.5 gram of the polyurethane product cut in small pieces in 50 cc. of a mixed solvent prepared from 1772 parts by weight of tetrahydrofuran and 285 parts by weight of dimethylformamide. In order to obtain the tetrahydrofuran for this purpose, peroxide-free (less than 0.02% as $H_2O_2$) tetrahydrofuran is distilled over metallic sodium, using about 2.5 grams of sodium per liter of tetrahydrofuran. A still residue of about 125 cc. per liter charged is discarded at the end of the distillation. The dimethylformamide is purified by distillation, the portion boiling at 151–152° C. being used. The polymer is dissolved in the mixed solvent by shaking in a stoppered container. The solution is then centrifuged for 30 minutes at 750 r.p.m. to remove any traces of gel or dirt.

Portions of this solution are further diluted with mixed solvent to give three different samples having concentrations of 1, 0.5 and 0.25 grams of polyurethane product, respectively, per 100 cc. of mixed solvent. The flow time of each solution is then determined in an Ostwald-Fenske viscosimeter, using 10 cc. of solution and making duplicate determinations. The duplicates should check within 0.2 second. It is necessary that the viscosimeter tubes be scrupulously clean. Flow times are measured by permitting the solution to flow through the tube by gravity and determining the time required for the meniscus to pass between two marks on the tube. The flow time for mixed solvent alone is run in the same tube, the tube being carefully cleaned in between. The specific viscosity of each solution is given by the equation:

$$\eta_{sp} = \frac{t - t_0}{t_0}$$

where $t$ is the flow time of the solution and $t_0$ is the flow time of the solvent alone. Specific viscosity divided by concentration of polymer in grams per 100 cc. of solvent is then plotted against concentration. The intercept of a line drawn through the three points with the axis where the concentration is zero represents the intrinsic viscosity.

The process of this invention is illustrated in the following examples.

Example 1

One molar part of polytetramethylene ether glycol having a molecular weight of 3080 and an acid number of 0.7 is placed in a stainless steel Werner-Pfleiderer mixer with 0.37 molar part of water and thoroughly mixed at 45° C. There are then added 2.1 molar parts of 2,4-tolylene diisocyanate. Mixing is carried on for 3 hours while the temperature is raised from 45° to 80° C. There are added 1.09 molar parts of water and the temperature is raised to 150° C. Mixing is continued for 90 minutes. The product is in the form of rubbery chunks which will no longer remain in the blades of the mixer. The mass is removed and milled on a rubber mill while 0.59 part of piperidine per 100 parts by weight of elastomer is added as a stabilizer. The product has an intrinsic viscosity of 1.03 and a 100° mill scorch of 30 minutes.

Portions of this mass are peptized as follows: A small Werner-Pfleiderer type mixer is heated by passing steam at 130–134° C. through the jacket. The stabilized elastomer is put in the mixer and worked for 10 minutes. The peptizing agent is then added through a port in the lid of the mixer and mixing is continued for 15 more minutes. The product is then removed from the mill.

The following table shows the reduction in intrinsic viscosity obtained by using the various peptizing agents listed, in the amounts shown:

| Agent | Parts by weight agent per 100 parts polymer | Intrinsic viscosity | Mill scorch, 100° C., minutes |
|---|---|---|---|
| None | none | 0.85 | 41 |
| Methylethanolamine | 0.1 | 0.72 | 98 |
| Do | 0.2 | 0.62 | 84 |
| Diethanolamine | 0.2 | 0.66 | 64 |
| Monoethanolamine | 0.2 | 0.64 | >60 |

Mill scorch is determined by homogenizing 100 parts by weight of the polymer on a rubber mill with 4 parts of N,N'-bis(3-isocyanato-4-methylphenyl) urea at as low a temperature as possible, placing a portion on a rubber mill heated to 100–101° C., and milling. The milling time elapsed before the first hole appears in the sheet on the mill roll is the scorch time. The samples are all run under strictly comparable conditions.

Each of the elastomers described above is cured by first milling on a rubber mill with 6 parts by weight of N,N'-bis(3-isocyanato-4-methylphenyl) urea per 100 parts of elastomer and then heating in a mold under pressure at 125° C. for 1 hour. The cured elastomers have the following properties:

| Peptizing agent | Tensile strength at break, p.s.i. | Modulus at 300% elongation, p.s.i. | Elongation at break, percent |
|---|---|---|---|
| None | 4,710 | 620 | 660 |
| Methylethanolamine (0.1%) | ¹4,975 | ¹875 | ¹670 |
| Methylethanolamine (0.2%) | >5,110 | 695 | 665 |
| Diethanolamine (0.2%) | 4,970 | 680 | 630 |
| Monoethanolamine (0.2%) | >5,110 | 740 | >635 |

¹ Dumbbells tested in air. Other values are for Williams rings tested in water at 25° C.

Example 2

The elastomer described in Example 1 is peptized with the agents shown below by the same procedure. The intrinsic viscosities are as follows:

| Peptizing agent | Parts by weight agents per 100 parts polymer | Intrinsic viscosity |
|---|---|---|
| None | none | 0.85 |
| Isopropanolamine | 0.2 | 0.69 |
| Diisopropanolamine | 0.2 | 0.69 |
| Aminoethylethanolamine | 0.2 | 0.71 |

Example 3

One molar part of polytetramethylene ether glycol having a molecular weight of 3000 and an acid number of 0.9 is placed in a stainless steel Werner-Pfleiderer mixer with 0.36 molar part of water and mixed at 45° C. There are added 2.1 molar parts of 2,4-tolylene diisocyanate and mixing is continued for 3 hours while the temperature is raised to 80° C. 1.09 molar parts of water are added and milling is continued for an additional 90 minutes while the temperature is raised to 150° C. The mass is now out of the blades and is transferred to a rubber mill where 0.51 part by weight of piperidine per 100 parts of polymer is milled in to stabilize it.

Portions of the elastomer are peptized by the procedure of Example 1 with various amounts of methylethanolamine, with the following results:

| Parts peptizing agent per 100 parts polymer | Behavior on rubber mill | Mill scorch, 130° C., minutes |
|---|---|---|
| none | tough | 15 |
| 0.2 | good | 32 |
| 0.4 | soft | 45 |
| 0.8 | tacky ¹ | 47 |

¹ This elastomer has a tendency to stick to the mill roll. It is somewhat difficult to remove but pulls off cleanly.

Example 4

An elastomer is prepared according to the general procedure described in Example 3. It is, however, somewhat precured and has an intrinsic viscosity of 1.03, a 130° mill scorch of less than 5 minutes and is very tough. 100 parts by weight of the polymer are milled with 0.25 part of methylethanolamine in a Werner-Pfleiderer mixer which has previously been heated to 130–135° C. Mixing is continued for 15 minutes. The polymer is removed. It now has an intrinsic viscosity of 0.7 and a 130° C. scorch time of 28 minutes.

100 parts by weight of the polymer are mixed on a cold roller mill with 40 parts of carbon black and 6 parts of 2,4-tolylene diisocyanate, and then calendered to give strips approximately 50 mils thick and about 5 inches wide. These strips are taken off onto a polychloroprene cushion about 40 mils thick and coated with polychloroprene cement, and the resulting composite tread is then applied by means of a polychloroprene cement to the buffed GR–S surface of a commercial automobile tire. The thickness of the polyalkylene ether glycol-diisocyanate polymer portion of the tread is about 0.375 inch. The composite structure is cured in a retread mold for 60 minutes at 138° C. The tire is then road tested on a test car. The test is discontinued at 12,000 miles at which time the tire is in excellent shape and only about 25% of the tread stock has been worn off.

The unpeptized elastomer is too tough to permit the processing necessary to form a tire.

Example 5

One molar part of polytetramethylene ether glycol having a molecular weight of 2975 and an acid number of 0.53 is mixed with 0.32 molar part of water in a Werner-Pfleiderer mixer at 45° C. for 30 minutes. There are added 2.3 molar parts of 2,4-tolylene diisocyanate and mixing is carried on for 2.5 hours at 75-80° C. There are then added 1.67 molar parts of water and mixing is continued for 30 minutes while the temperature is raised from 80° to 135° C. The rubbery polymer is now out of the blades. Instead of removing it to a rubber mill and stabilizing it with piperidine as in the previous examples, a ram is applied to the mass to force it back into the blades and mixing is continued for a further 10 minutes, thus deliberately precuring the polymer. It is now a crumbly powder which will not mill or sheet out on a rubber mill. When put on a mill the crumb falls through or off the mill.

100 parts by weight of this crumb are put into a Werner-Pfleiderer mixer preheated with 130-135° C. steam in the jacket and after mixing for 10 minutes, 3.5 parts of methylethanolamine are added. Mixing is continued for 15 minutes. The product is now a soft polymer which is readily handled on a rubber mill, sheeting off the mill in smooth, homogeneous sheets.

A 10-part portion is milled with 0.8 part of N,N'-bis(3-isocyanato-4-methylphenyl) urea and then cured in a mold for 30 minutes at 134° C. under pressure. A smooth, well-cured rubbery slab is obtained.

*Example 6*

One molar part of polytetramethylene ether glycol having a molecular weight of 3024 and an acid number of 0.61 is mixed in a Werner-Pfleiderer mixer with 0.32 molar part of water at 45° C. for 30 minutes. 2.3 molar parts of 2,4-tolylene diisocyanate are added and mixing is continued for 2.5 hours at 75-80° C. 2.52 molar parts of water are added and mixing is continued for 30 minutes while the temperature is raised to 135° C. The rubbery mass is out of the blades of the mixer at the end of this time. It is transferred to a rubber mill and sheeted out and 0.32 part by weight of piperidine is added for each 100 parts of polymer to stabilize it.

100 parts by weight of the stabilized polymer are then milled on a rubber mill with 3 parts of N,N'-bis(3-isocyanato-4-methylphenyl) urea. A portion is put in a mold and cured by heating under pressure at 134° C. for 15 minutes. There is obtained a tough, rubbery, cured elastomer which cannot be handled on a rubber mill.

A portion is cut up into small pieces and put in a Werner-Pfleiderer type mixer which has been preheated with 130-135° C. steam in the jacket. After mixing for 10 minutes, methylethanolamine is added in the proportion of 8 parts by weight per 100 parts of cured elastomer. Mixing is continued for 15 minutes. The product is now in the form of rubbery crumbs. These crumbs are put on a rubber mill and sheet out readily.

10 parts of this product are then milled with 0.8 part of N,N'-bis(3-isocyanato-4-methylphenyl) urea and cured in a mold at 134° C. under pressure for 30 minutes. There results a well-cured elastomer which is very similar to the original cured elastomer.

*Example 7*

Into a Werner-Pfleiderer mixer are placed 180 parts of polytetramethylene ether glycol having a molecular weight of 995, containing 0.02% water, and having a zero acid number and 22.5 parts of 2,4-tolylene diisocyanate. The mixer is run for 3 hours at 100-105° C., after which time the reactants are in the form of a viscous liquid. The mass is cooled to 75° C. and 0.35 part of water is added. After mixing for 15 minutes, 25.5 parts of 2,4-tolylene diisocyanate are added and mixing is continued for 2.5 hours at 70-75° C. There is added 7.64 parts of water and mixing is continued a further 23 minutes, during which time the temperature rises to about 114° C. and the mass forms rubbery chunks which tend to ride on top of the mixer blades. The polymer is stabilized by spraying 1.25 parts of piperidine onto the mass and mixing for 10 minutes. The Mooney viscosity (A.S.T.M. D1077-49T, 212° F., small rotor) is about 55.

The mass is then peptized in the mixer by adding 0.55 part of methylethanolamine and mixing for 15 minutes at 110-135° C. The product is still in the form of rubbery chunks but these are softer than before peptization. The Mooney viscosity is 18. The mass is then removed from the mixer, put on a rubber mill and sheeted off.

By the practice of this invention, polyurethane products which otherwise could not be successfully processed or which would yield inferior molded products can be handled satisfactorily to give products of good quality. Polyurethane products which are workable but which are tougher or more viscous than desired can be softened by means of the peptizing agents described herein. Scrap or used vulcanized elastomer can also be reclaimed by this process.

Not only is the workability of polyurethane products improved by this process but there is a notable increase in the "scorch" resistance of the products. Scorch, as known in the rubber industry, is the tendency of a compounded elastomer to show evidence of premature curing. This shows up readily on a rubber mill where scorch is indicated by the formation of holes in the elastomer sheet and by a general tendency not to form a smooth sheet on the mill. A scorchy elastomer cannot be processed to give a smooth homogeneous molded article. Products which have been peptized according to this invention yield homogeneous articles and can be readily cured to give useful elastomers.

I claim:

1. A process of peptizing a high molecular weight polyurethane product, said product being comprised essentially of structural units having the formula

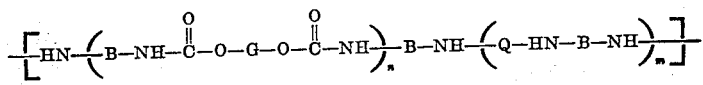

wherein O—G—O is a bivalent radical resulting from removal of the terminal hydrogen atoms from a polyalkyleneether glycol having a molecular weight of at least 750; R is a bivalent organic radical, said radical being inert to isocyanate groups; Q is a radical selected from the group consisting of a carbonyl radical and a non-polymeric diacyl radical, said diacyl radical being free from any intralinear unsaturation other than carbon to carbon unsaturation; $n$ is an integer greater than zero; and $m$ is an integer including zero; each of the said structural units being connected to the next by a radical R, having the significance defined above; the overall ratio of the number of R to O—G—O radicals in the polymer being between 1.1:1 and 12:1; and at least 35% of the total weight of the polymer being the bivalent radicals O—G—O; which comprises mixing the said polyurethane product with from 0.1 to 10 parts by weight per 100 parts by weight of said polyurethane product of a lower alkylolamine having the formula $(X)_2$—NH wherein X is a radical selected from the group consisting of hydrogen and of alkyl, aminoalkyl, aminohydroxyalkyl and hydroxyalkyl radicals containing from 1 to 4 carbon atoms with the proviso that at least one of the X's is hydroxyalkyl.

2. A process according to claim 1 in which the lower alkylolamine is methylethanolamine.

3. A process according to claim 1 in which the lower alkylolamine is ethanolamine.

4. A process according to claim 1 in which the lower alkylolamine is diethanolamine.

5. A process according to claim 1 in which the lower alkylolamine is isopropanolamine.

6. A process of peptizing a cured polyurethane elastomer, said elastomer being obtained by curing the reaction product of a polytetramethyleneether glycol having a molecular weight of at least 750, an organic diisocyanate and a chain extending agent having a plurality of active hydrogen atoms capable of reacting with isocyanates, no more than two atoms in the molecule of the said chain-extending agent having active hydrogen attached thereto, said chain-extending agent being selected from the group consisting of water, hydrogen sulfide and organic compounds containing two functional groups in the molecule to which are attached active hydrogen atoms, which comprises mixing 100 parts by weight of the said cured polyurethane elastomer with from 6 to 10 parts by weight of a lower alkylolamine having the formula $(X)_2$—NH wherein X is a radical selected from the group consisting of hydrogen and of alkyl, aminoalkyl, aminohydroxyalkyl and hydroxyalkyl radicals containing from 1 to 4 carbon atoms, with the proviso that at least one of the X's is hydroxyalkyl.

7. A process of peptizing a polyurethane product which is difficultly millable on a roller mill, said product being the reaction product of a polytetramethyleneether glycol having a molecular weight of at least 750, an organic diisocyanate and a chain extending agent having a plurality of active hydrogen atoms capable of reacting with isocyanates, no more than two atoms in the molecule of the said chain-extending agent having active hydrogen attached thereto, said chain-extending agent being selected from the group consisting of water, hydrogen sulfide and organic compounds containing two functional groups in the molecule to which are attached active hydrogen atoms, which comprises mixing 100 parts by weight of the said polyurethane product with from 0.1 to 1 part by weight of a lower alkylolamine having the formula $(X)_2$—NH, wherein X is a radical selected from the group consisting of hydrogen and of alkyl, aminoalkyl, aminohydroxyalkyl and hydroxyalkyl radicals containing from 1 to 4 carbon atoms, with the proviso that at least one of the X's is hydroxyalkyl.

8. A process of reclaiming and curing a polyurethane elastomer, said elastomer being obtained by curing the reaction product of a polytetramethyleneether glycol having a molecular weight of at least 750, an organic diisocyanate and a chain extending agent having a plurality of active hydrogen atoms capable of reacting with isocyanates, no more than two atoms in the molecule of the said chain-extending agent having active hydrogen attached thereto, said chain-extending agent being selected from the group consisting of water, hydrogen sulfide and organic compounds containing two functional groups in the molecule to which are attached active hydrogen atoms, which comprises mixing the said cured elastomer with from 6 to 10 parts by weight per 100 parts by weight of said elastomer of a lower alkylolamine having the formula $(X)_2$—NH wherein X is a radical selected from the group consisting of hydrogen and of alkyl, aminoalkyl, aminohydroxyalkyl and hydroxyalkyl radicals containing from 1 to 4 carbon atoms, with the proviso that at least one of the X's is hydroxyalkyl, said mixing being carried out until the mixture has become sufficiently peptized to form a sheet on a rubber mill, incorporating with the said peptized mixture from 1 to 20% by weight, based on the weight of the peptized mixture, of an organic compound containing at least two isocyanate groups and curing at a temperature between 80 and 175° C.

References Cited in the file of this patent

UNITED STATES PATENTS

| 2,531,392 | Breslow | Nov. 28, 1950 |
| 2,777,831 | Seeger et al. | Jan. 15, 1957 |

FOREIGN PATENTS

| 580,524 | Great Britain | Sept. 11, 1946 |
| 581,136 | Great Britain | Oct. 2, 1946 |
| 581,143 | Great Britain | 1946 |

UNITED STATES PATENT OFFICE

CERTIFICATE OF CORRECTION

Patent No. 2,917,471                                          December 15, 1959

Jerry A. Nelson

It is hereby certified that error appears in the printed specification of the above numbered patent requiring correction and that the said Letters Patent should read as corrected below.

Column 8, lines 49, and 58, for "R", each occurrence, read -- B --.

Signed and sealed this 7th day of June 1960.

(SEAL)
Attest:

KARL H. AXLINE                                                 ROBERT C. WATSON
Attesting Officer                                       Commissioner of Patents